United States Patent [19]

Takai et al.

[11] Patent Number: 4,791,505
[45] Date of Patent: Dec. 13, 1988

[54] CYCLIC ACTUATOR LOCK FOR TAPE PLAYER

[75] Inventors: Kazuki Takai; Toshihiro Ikahata; Wataru Watanabe, all of Tokyo, Japan

[73] Assignee: Clarion Co., Ltd., Tokyo, Japan

[21] Appl. No.: 781,215

[22] Filed: Sep. 26, 1985

Related U.S. Application Data

[63] Continuation-in-part of Ser. No. 563,673, Dec. 20, 1983, abandoned, and a continuation-in-part of Ser. No. 565,059, Dec. 23, 1983, abandoned.

[30] Foreign Application Priority Data

Dec. 20, 1982 [JP]  Japan ............................ 57-222166
Dec. 23, 1982 [JP]  Japan ............................ 57-225004
Dec. 28, 1982 [JP]  Japan ............................ 57-233035
Dec. 28, 1982 [JP]  Japan ............................ 57-233030

[51] Int. Cl.[4] ............................................ G11B 15/00
[52] U.S. Cl. ........................................ 360/137; 360/88
[58] Field of Search .......................... 360/96.1–96.4, 360/105, 74.1, 137, 90, 93, 88

[56] References Cited

U.S. PATENT DOCUMENTS

| | | | |
|---|---|---|---|
| 4,149,202 | 4/1979 | Terada et al. | 360/90 X |
| 4,223,362 | 9/1980 | Kishi | 360/137 |
| 4,225,894 | 9/1980 | Fulukawa et al. | 360/137 |
| 4,507,694 | 3/1985 | Hosono et al. | 360/90 |

Primary Examiner—Robert S. Tupper
Assistant Examiner—Andrew L. Sniezek
Attorney, Agent, or Firm—Wallenstein, Wagner, Hattis & Strampel Ltd.

[57] ABSTRACT

An intermittently driven cyclic drive member for operating a system of a tape player between a plurality of operative positions thereof includes a quick-return lock for re-establishing a locking position with respect to the drive member. The quick-return lock is actuated to a released position during only the initial movement of a power plate, returning immediately thereafter to an intercepting position and remaining positively fixed there throughout the entire remainder of the actuation stroke of the release member. Provision is further made to couple the locking system of the present invention to a second system of the player, as for example a drive disconnect plate, so that the aforementioned unlocking condition cannot be established unless the second system is properly positioned. The system further features an additional intermittent motor drive coupling system having dormant non power-transferring condition so that accidental release of the above mentioned locking mechanism, will not cause spontaneous actuation of the cyclic actuation system.

11 Claims, 17 Drawing Sheets

CYCLIC ACTUATOR LOCK FOR TAPE PLAYER

RELATED APPLICATIONS

This application is a continuation-in-part of U.S. patent application Ser. No. 563,673 filed Dec. 20, 1983 and U.S. patent application Ser. No. 565,059 filed Dec. 23, 1983 both now abandoned.

FIELD OF THE INVENTION

This invention relates to a tape player using motor power to cyclically actuate components for effecting reconfiguration of various mechanisms of a tape player to allow such operations as program changes, cassette loading, cassette ejecion, hand displacement and other operations, and more particularly to a lock mechanism in such tape player to detach said components from the motor and lock them in their rest positions.

BACKGROUND OF THE INVENTION

There are currently widely used auto-reversion-types of automatic drive program or mode changing-type players which employ motor power to effect operations reconfiguring various subsystems to accomplish such operations cyclically between one or more positions thereof as cassette loading and ejection, displacement of a head to and away from a tape, displacement of pinch rollers to and away from capstans, and automatic changes of tape travelling direction in bidirectional players to eliminate the manual operation of taking a tape cassette out of the tape player in order to revert it. Such motor-actuated components must be detached from the motor and reliably locked in their rest positions during their individual off times.

For example, motor power is transmitted via an intermittent power transmission member to such a program or mode changing mechanism to have it effect drive mode changes. However, when a tape starts a normal travel after the mode or system configuration is changed to a desired one, the transmission member must be locked so as not to link the mode changing mechanism to the motor which continues rotating.

In many tape players, a single motor is used to selectively actuate said mechanisms, and it is necessary to keep one of the mechanisms decoupled from the motor while another is actuated. For example, since undesired phenomena will occur if a head shifting mechanism is linked to the motor while a drive program changing mechanism is actuated to reverse the tape drive from normal-play forward to normal-play reverse, the head shift mechanism must be locked out of linkage with the motor. To this end, the motor and such mechanisms to be selectively and intermittently driven by the motor must be provided therebetween with a lock mechanism consisting of (1) a lockable member (intermittent power transmission member) linked to a mechanism of the player to be selectively driven, (2) a lock member for keeping the lockable member in a disengaged position to be held decoupled from the motor, and (3) release member actuated on command for releasingly displacing the lock member so as to permit the lockable member to couple with the motor.

There are two general types of prior art lock mechanism. Their constructions and disadvantages will be described below by way of examples illustrated in FIGS. 1 to 4, wherein an intermittent gear is employed as said lockable member to be selectively driven by the motor.

In both examples, the intermittent (sector) gear 1 of a cyclic actuator is disposed adjacent to drive gear pinion 2 which is continuously driven by a motor (not shown). In the two-stroke actuator shown, the intermittent gear 1 is formed with a pair of cutouts 3-3 partly breaking the circumferential tooth train thereof. If either cutout 3 reaches a point generally confronting the drive gear 2 and is locked there, the motor power is not transmitted thereto. When the intermittent gear 1 is unlocked by an release member 4, gear 1 is rotated clockwise nearly instantaneously (by representative means to be discussed subsequently) and the intermittent gear engages the drive gear 2 again. As a result, the intermittent gear 1 is allowed to rotate clockwise and transmit the motor power to the program changing or other mechanism.

FIGS. 1 and 2 show one type of prior art lock mechanism wherein the release member 4 mounted on a reciprocally actuatable power plate 50 is always pressed against the lock member 5 by a spring 6 so that the lock member 5 is forced to stay in an unlocking position until the release member 4 returns to its non-actuated dormant position.

The lock member 5 is normally biased clockwise to engage the intermittent gear 1 by the spring 6, and the tip thereof engages and locks one of the pins 7 formed on the lower face of the intermittent gear. When the release member 4 pushes the lock member 5 it rotates counterclockwise away from the intermittent gear 1 against the biasing force of the spring 6 and unlocks the intermittent gear 1. Since the release member 4 continuously engages the lock member 5 until it fully returns to the original position, the intermittent gear 1 is allowed to rotate throughout this time.

This prior art lock mechanism has the following drawback. Unless the power plate 50 reciprocates very quickly, the lock mechanism cannot comply with a requirement of reestablishing an intercepting position with respect to the intermittent gear 1 immediately after the gear 1 starts to rotate to transmit motor power to the linked associated mechanism. Since relocking by the lock member 5 is possible only after completion of the reciprocation of the release member 4, the intermittent gear 1 will continue rotating and transmitting the motor power to the linked mechanism throughout the reciprocation of the unlock member. Therefore, this prior art lock mechanism is not useful when the motor power is to be transmitted to the linked associated mechanism for a time shorter than that of the reciprocation of the release member 4.

In particular, a program changing operation of an associated driven program changing mechanism in a bidirectional tape player is effected by one-way trip thereof from the forward-drive position to the reverse-drive position thereof, and is finished in a very short time. Therefore, if the mechanism is fully linked to the reciprocation of the unlock member 4 as shown, the program changing operation may be completed too early and thus may accidentally repeat once more before the release member 4 returns to its original position.

FIGS. 3 and 4 show the other type of prior art lock mechanism, which is designed to overcome the above-mentioned drawback, namely to enable such an immediate repositioning operation.

This lock mechanism is designed to unlock the intermittent gear 1 by downward movement (in the Figures)

of the release member 4 to a moderate extent and also to re-establish an intercepting position during a further downward movement of the unlock member 4. As before, the lock member 5 is normally biased clockwise to the intermittent gear 1 and engages one of the pins 7. When the release member 4 moves downward and pushes a confronting surface of a tapered cam 8 integral with the lock member 5, the lock member 5 rotates counterclockwise away from the intermittent gear 1 and unlocks it. As the unlock member 4 further moves downward and passes over the tapered cam 8, the release member 4 disengages from the lock member 5 and allows it to return to an intercepting position with respect to the intermittent gear 1 due to the biasing force of the spring 6, and the lock member 5 will subsequently capturingly reengage the pin 7.

This latter quick-return prior art lock mechanism, however, has the drawback that the release member 4 engages the tapered cam 8 again during the returning movement to the original position, and moves the lock member 5 momentarily to a non-intercepting position. Thus, if the intermittent gear 1 should unexpectedly have rotated to be locked again by this time, again an unintended and untimely actuation of the intermittent gear 1 occurs, causing the mechanism to change a properly selected program state to an undesired one, as in the former prior art lock mechanism.

As described above, these both prior art lock mechanisms cannot reliably create a short-time unlocked state by use of a release member 4 requiring a significant time for reciprocation. This problem remains also if the intermittent gear 1 is replaced by any other kind of member for intermittently and selectively transmitting the motor power to a linked system mechanism.

Since it is a continuing objective to reduce the time for such program changing operations, cassette loading and ejection operations, or other system reconfigurations, by such cyclic actuator mechanisms, and since the time for reciprocation of the unlock member cannot easily be reduced significantly because its reciprocation is effected by moving the power plate by a cam driven by the motor, it is important to provide a lock mechanism capable of re-establishing an intercepting or locking position almost immediately after the unlocked state is once created.

Additionally, another drawback of both types of the prior art mechanism is the fully concurrent movement of the release member and the lock member whereby the movement of the release member 4 always releases the lock member 5. This may arise from unintended or accidental actuation of the power plate 50, and thus causes the lock member 5 unexpectedly and untimely to unlock a properly locked intermittent gear 1 to allow its inadvertent actuation.

For example, a program changing mechanism shifting from normal-speed forward play to normal-speed reverse play must be actuated only when the head is fully shifted to the play position for proper contact with a tape. However, due to the above limitation and in the absence of means for detecting whether the head is fully shifted to the play position or not, the prior art lock mechanisms often cause the phenomenon that the power plate 50 can untimely unlock the intermittent gear 1 and permit the program changing mechanism to change the program drive condition irrespective of the position of the head.

It is often difficult to judge when various components of a player system are in the proper positions prior to release of the lock member 5 of the intermittent gear 1. Therefore, if such unreliable sensing systems are employed for automatically preventing, for example, fast-forwarding or rewinding means from operating when the head is at the play position, or for preventing ejecting means and head shift means from operating when a cassette is not yet loaded in the tape player, undesirable phenomena will often occur.

Considering all of the foregoing limitations of the prior art, it would therefore be a desirable feature to provide a lock mechanism capable of re-establishing an intercepting position of the lock member immediately after unlocking the intermittent power transmission member, and to prevent subsequent unlocking of a properly locked intermittent power transmission means during the return movement of the power plate.

It would further be useful to provide a lock mechanism incapable of unlocking the intermittent power transmission means even upon movement of the power plate unless necessary system conditions are present.

Finally, prior art lock mechanisms typically suffer from a disadvantage in high-shock environments, such as encountered by automobile tape players, in that a sudden shock to the system can, on occasion, cause momentary disengagement of the lock member, with the result that its associated cyclic actuator will proceed to execute its drive cycle without actuation of the power plate. It would therefore be a further useful feature to provide a drive system associated with the power plate which would cause cyclic actuation of the cyclic actuator gear 1 attendant to actuation of the power plate, and only attendant to actuation thereof. Further, such a power plate drive system must be fully compatible with the two previously outlined objectives of achieving a single positive quick return of the lock member upon actuation of the power plate, and total disablement of the cyclic actuator in the event that an associated system of the tape player is mispositioned.

SUMMARY OF THE INVENTION

According to a feature of the present invention there is provided a quick-return lock mechanism for a tape player cyclic actuator. This is achieved by replacing the usual confronting shoulder integral with the lock member and disposed to be engagingly driven by a release member, most typically a pin, mounted on and reciprocally driven by a power plate, by a pivotally mounted spring-biased camming latch member. Prior to engagement of the confronting shoulder of the camming latch member, the spring associated therewith deploys the latch member to an extended position wherein the confronting shoulder is in line with the motion of the power plate release member. Initial actuation of the power plate causes the release member to strikingly engage the confronting shoulder of the camming latch member to rotate the lock member to a disengaged position allowing immediate rotation of the cyclic actuator intermittent gear to an engaging driven position with the motor drive pinion. A slight further advancing motion of the release member sufficiently rotates the lock member to carry the confronting shoulder of the camming latch member out of alignment with the release member. During subsequent advancing motion of the release member it presses against the camming surface of the camming latch member against the light force of the latch member biasing spring to slidingly move therepast. The lock member immediately resets to an intercepting position under the force of its relatively strong return spring once the release member engages the camming surface. On the return stroke of the release member the camming surfaces once again is engaged to rotate the camming latch against the force of its biasing spring to allow the release member to retract. Again, the strength of the lock member spring is sufficiently strong compared with the strength of the latch member deployment spring that during the retraction stroke of the power plate release member the net torque arising from both forces on the lock member is again such as to retain the lock member in an intercepting condition until the cyclic actuator completes its rotation to again be lockingly engaged by the lock member.

A further feature of the invention makes use of the pivotal properties of the camming latch member to permit retraction of the camming latch member to a non-confronting position with respect to the release member, by coupling the camming latch member to an associated mechanism of the player, such as a master disconnect plate removing drive power from reel base drives and withdrawing a pair of bidirectional tape drive capstans from tape contact. By this means, according to the position of this drive disconnect plate, the camming latch member is either deployed to a normal operative position where actuation of the power plate will successfully cause unlocking of the lock member and attendant actuation of the associated cyclic actuator, or in the alternative to withdraw the camming latch member to a non-confronting position such that accidental energization of the power plate cannot actuate the lock member to a released position. Accidental actuation of the cyclic drive mechanism causing drive reversal to the tape drive elements therefore cannot occur unless the drive disconnect plate is properly positioned.

According to another feature of the invention, an improved power transfer gearing system associated with the power plate provides for a second intermittent motion (sector) gear coupling a continuously motor-driven gear to the cyclic actuator gear run a pair of coupled pinions. The two sector gears are synchronized in such a way that both sector gears are simultaneously in a dormant position with respect to their respective drive pinions so that power cannot be transferred to the cyclic actuator upon accidental release of the actuator gear lock member, as for example under high vibration or high shock conditions.

Other advantages and features of the invention will become apparent upon making reference to the specification, claims, and drawings to follow.

DETAILED DESCRIPTION OF THE PREFERRED EMBODIMENTS

Figure 1:
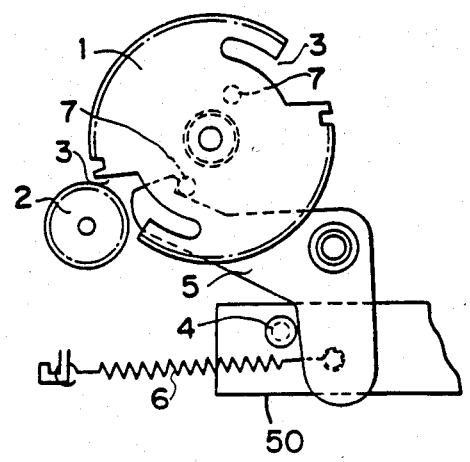
FIG. 1 is a plan view of first type prior art lock mechanism wherein a locked state is illustrated.
Figure 2:
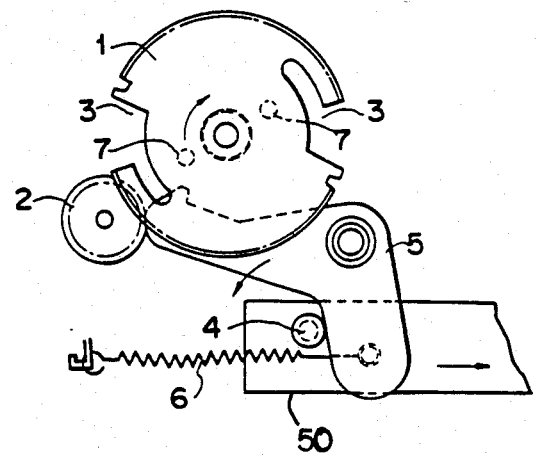
FIG. 2 is a plan view illustrating the unlocked state of the mechanism of FIG. 1.
Figure 3:
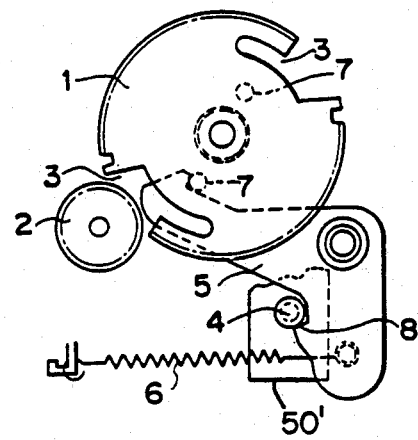
FIG. 3 is a plan view of second type prior art lock mechanism wherein a locked state is illustrated.
Figure 4:
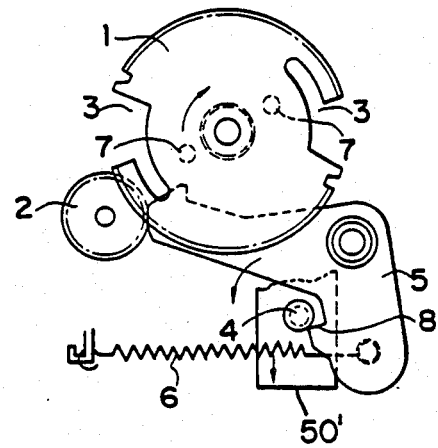
FIG. 4 is a plan view illustrating the unlocked state of the mechanism of FIG. 4.

One aspect of the invention will now be described in detail by way of a preferred embodiment illustrated in FIGS. 5 to 7. The particular embodiment shown is applied to an intermittent two-stroke cyclic actuator gear 1 as the member to be locked by the lock member, as in the case of the prior art previously discussed with respect to FIGS. 1-4.

The intermittent (sector) gear 1 of the cyclic actuator used as the lockable member thereof has a pair of symmetrically disposed pins 7 engageable with the lock member 5, which will be described later, to stop the intermittent gear 1 every half revolution thereof. The lock member 5 is located generally below the actuator gear 1 and above the power plate 50, and is pivotally supported by an axle pin 10 mounted to the base of the tape player. One end thereof is provided with an engagement portion 5a engageable with the pins 7-7 extending downward from the lower face of the intermittent gear 1. The lock member 5 is provided with a camming latch member 11 generally closely underlying the lock member 5 and having an elongated hole 11a receiving the axle 10 therein.

The latch member 11 carries an axle pin 12 at one end remote from the elongated hole 11a. The pin 12 is affixed to the other end of the lock member 5 remote from the engagement portion 5a. Thus, the latch member 11 is pivotal together with the lock member 5 about the axle 10 and is also independently pivotal with respect to the lock member 5 about the pin 12. The lower end of the pin 12 is inserted in an elongated hole 13 in the base plate of the tape player. A fairly weak torsion spring 14 biases the latch member 11 counteclockwise about the axle 12 so that the elongated hole 11a abuts the axle 10 at the rightmost end of hole 11a remote from the intermittent gear 1. A spring 6 is connected between the pin 12 and the base plate to bias the pin 12 clockwise to the left end of the elongated base plate hole 13 nearer to the intermittent gear 1 to keep the lock member 5 in a clockwise limit about pivot 10, thus locking the intermittent gear 1.

The latching member 11 is also formed with a confronting shoulder 11b and a retreating camming portion 11c so that the shoulder 11b engages the release member 4 (which will be described later) upon advancement thereof when the latch member 11 is fully deployed outward by the torsion spring 14. The camming portion 11c is tapered to permit the release member to push past it upon return motion thereof.

The release member 4 extends upward from the power plate 50, and is a pin-shaped member movable in the longitudinal up and down direction in the figures in response to movement of a power plate reciprocated by a motor (not shown). The release member 4 engages the step 11b of the camming latch member 11 before major advancement thereof, pushes it during advancement thereof and pushes past the camming portion 11c upon further forward and return motion of the release member.

In the initial dormant state of the system (FIG. 5), the release member 4 is not supplied with energy from the power source and stays at the original (retreat) position. The lock member 5 is biased clockwise and rotated about the axle 10 by the spring 6, thereby locking the pin 7 of the intermittent gear 1 by the engagement portion 5a. The latch member 11 is deployed counterclockwise outward about pivot 12 by its weak spring 14. The unlocking operation of the release member 4 has not yet been initiated.

Upon initial downward motion of the power plate, the release member 4 starts to advance and push the step 11b of the latch member 11. The latch member 11 rotates about pivot 10 in the counter-clockwise direction in the Figures, accordingly. The lock member 5, which is connected to the pin 12 of the auxiliary member 11, thus simultaneously rotates counterclockwise about the axle 10. The engagemement poriton 5a of the lock member 5 therefore rotates away from the pin 7 and unlocks the intermittent gear 1 (FIG. 6). The intermittent gear 1 is now allowed to immediately rotate into mesh with the drive gear 2 thus initiating the cyclic actuation of gear 1.

When the unlock member 4 further advances and passes beyond the step 11b, the latching member 11 is released from the counterclockwise pressure of the release member 4. Because of the relatively weak force of the latch spring 14 compared to the lock spring 6, the latch member 11 then rotates clockwise to allow unobstructed passage of the release member 4 in the remainder of the downward stroke (FIG. 7), and the lock member 5 immediately rotates to an intercepting position to subsequently lock the gear 1 at the end of a half-rotation thereof. Note that the abutment of pivot pin 12 with the left end of the chassis cutout hole 13 prevents undue clockwise rotation of the latch member 5.

After the release member 4 fully advances downward, it starts retreating upward. During the withdrawal, the unlock member 4 again contacts the camming portion 11c. Again, because of the superior strength of the lock spring 5 over the latch spring 14, the pin 12 remains in contact with the left end of the chassis hole 13. Therefore, the pressure from the release member 4 on the camming portion 11c causes the latch member 11 to rotate about the pin 12 in the clockwise direction without rotating the lock member 5 counterclockwise, and thus maintains the engagement of the engagement portion 5a at the tip of the lock member 5 with the pin 7 of the intermittent gear 1. With a further withdrawal of the unlock member 4 passing over the camming portion 11c, the latch member 11 again deploys counterclockwise outward under the biasing force of the torsion spring 14 to where it was before actuation of the power plate 50.

The above-described embodiment may be extended to a variety of cyclic actuators. Thus, the release member 4 may be formed on a component to be reciprocated by manual operation, instead of by a power plate.

As the lockable member for intermittent power transmission to a system of the tape player, a component for linear or arcuate movement may be employed instead of the rotary intermittent gear 1 illustrated. To effect the lock of the lockable member, the lockable member may be provided with a female engagement means instead of the illustrated pins 7-7 while the lock member 5 may be provided with a correspondingly configured male engagement means.

To allow the latch member 11 concurrently to move with the lock member 5 during only one stroke of the reciprocation of the release member 4, in place of the engagement between the elongated hole 11a of the latch member 11 and the axle 10, a projection may be formed back to back with the step 11b for engagement with the corresponding edge of the lock member 5.

The lock mechanisms described herein may be used for locking the program changing mechanism or alternatively for locking the loading/ejecting mechanism and the fast-forwarding/rewinding mechanism during play mode of the tape player.

The invention will now be described in detail by way of a further novel embodiment, referring to FIGS. 8-18. In these figures, reference numerals the same as those used in FIGS. 5 to 7 will be used to denote the same or similar elements wherever possible.

In this advanced embodiment a disabling feature is provided to prevent accidental actuation of the cyclic actuator by untimely operation of the power plate 50. A lock control member 15 is provided on an associated player system to confront a projection 11d formed along one edge of the latch member 11. The lock control member 15 is operatively linked to another given mechanism which must not operate concurrently with the mechanism driven by the intermittent gear 1, or which alternatively must be in a given position before actuation of the cyclic actuator. Until the necessary conditions for unlocking the lockable member 1 are present, the lock control member 15 is located in a postion to pull the projection 11d out of confrontation with the release member 4, so that the latch member 5 is not moved by the reciprocation of the power plate 50. When all the necessary conditions are met, the lock control member extension 15 moves to the left from the latch projection 11d to let the latch member 11 return to the position confronting with the release member 4.

Figure 8:
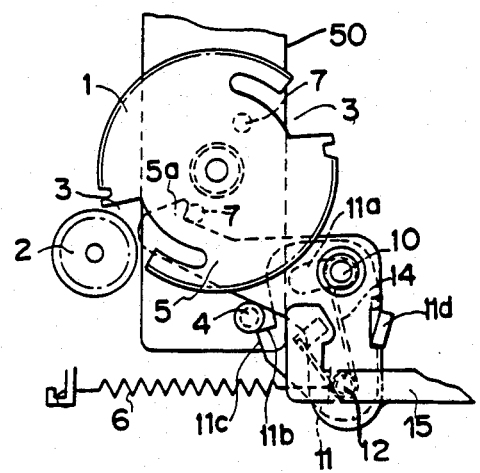
FIG. 8 is plan veiw of a further embodiment of the invention allowing disabling of the unlock mechanism wherein the camming latch member is located at its normal dormant position.
Figure 9:
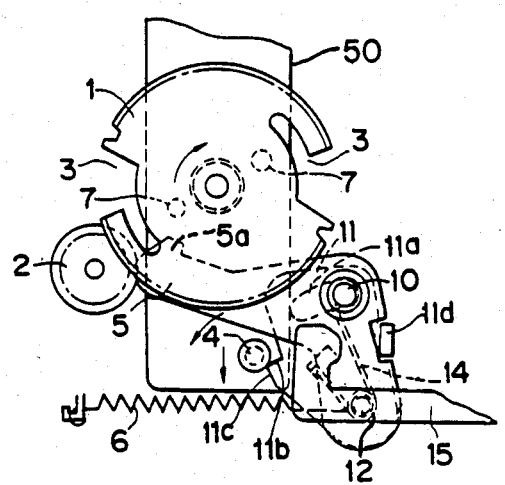
FIG. 9 is a plan view illustrating the unlocking phase of the mechanism of FIG. 8 and corresponding to FIG. 6.
Figure 10:
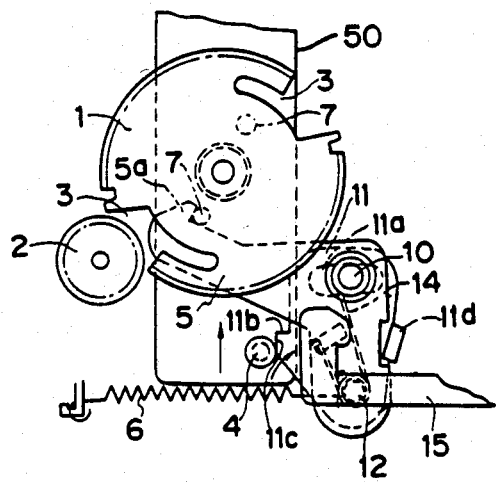
FIG. 10 is a plan view of the mechanism of FIG. 8 wherein the release member of the power plate is on the way back to its normal position, and corresponding to FIG. 7.

In more detail the lock release inhibiting mechanism operates as follows. If the associated mechanism is properly positioned so that an actuation of cyclic actuator may properly be carried out, the extension 15 of the associated mechanism will be displaced to the left as shown in FIGS. 8-10. Here it will be noted that the extension 15 is positioned to lie generally above the lock member 15 so that a rightward movement of the extension 15 will engagingly rotate the latch member 11 clockwise if the associated mechanism is mispositioned. Concentrating first on the situation where the associated mechanism is properly positioned for actuation of the cyclic actuator, an inspection of FIGS. 8-10 will show that the previously described quick-release and positive return feature of the lock member 5 will operate as previously described.

Figure 11:
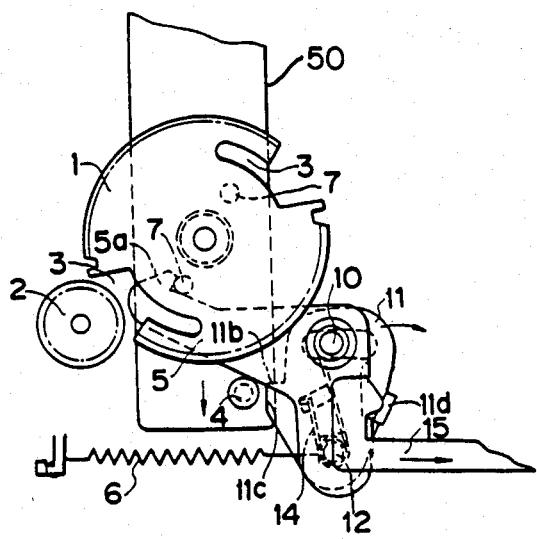
FIG. 11 is a plan view of the mechanism of FIG. 8 wherein a lock control member is actuated to prevent lock release.

If, on the other hand, the associated mechanism has not returned to its proper position in time for lock release to properly occur, then extension 15 will still be disposed in its rightmost position as shown in FIG. 11, thereby urging projection 11d of the member 11 clockwise, thereby rotating the latch member to a position where the confronting engaging shoulder 11b is out of confrontation with the release member 4 of the power plate. Clearly, untimely actuation of the power plate under such conditions will not cause release of the lock member 5 from its locking state, as a result of which an untimely and undesired operation of the cyclic actuator will not occur.

Summarizing thus far, the lock mechanism according to the invention by employing a pivotally mounted camming latch member 11 associated with the lock member 5 allows repositioning of the lock member 5 almost immediately after the unlocking thereof, and further prevents subsequent release thereof during the later retraction stroke of the release member 4. As a result, if the lock mechanism is used to lock various mechanisms of a tape player, locking repositioning is effected in a short time despite slow motions of such components as the power plate 50 or operation levers carrying the release member 4 thereon, thereby ensuring a reliable locking operation and leading to an improvement of operability of a tape player.

Further, a novel improvement of positionally regulating the latch member 11 associated with the lock member 5 by use of the lock control extension 15 ensure continuous locking of the locked member to keep the cyclic actuator mechanism inoperative until necessary conditions prior to actuation of the cyclic actuator mechanism are complied with. This prevents unexpected concurrent operations between various mechanisms and concomittant erroneous actuation of the tape player, thus improving the reliability of the tape player.

Figure 12:
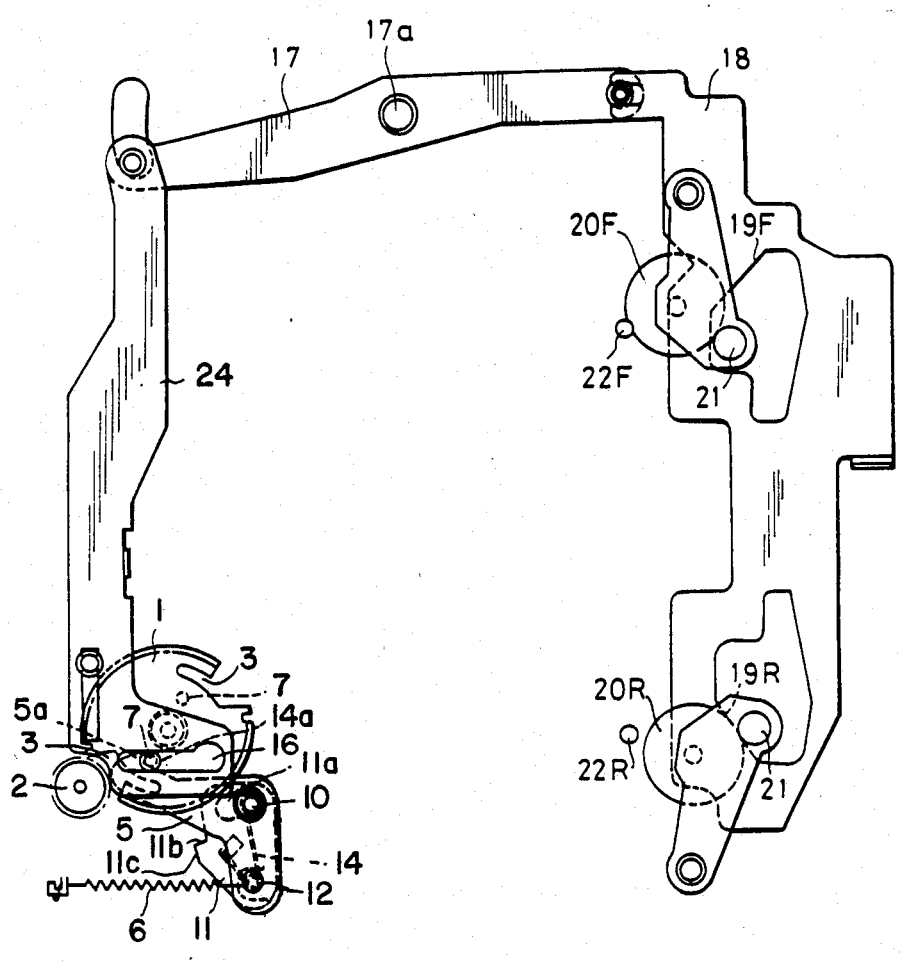
FIG. 12 shows a two-stroke cyclical actuator positioned to provide selective engagement of a forward drive capstan with its associated movable pinch roller.
Figure 13:
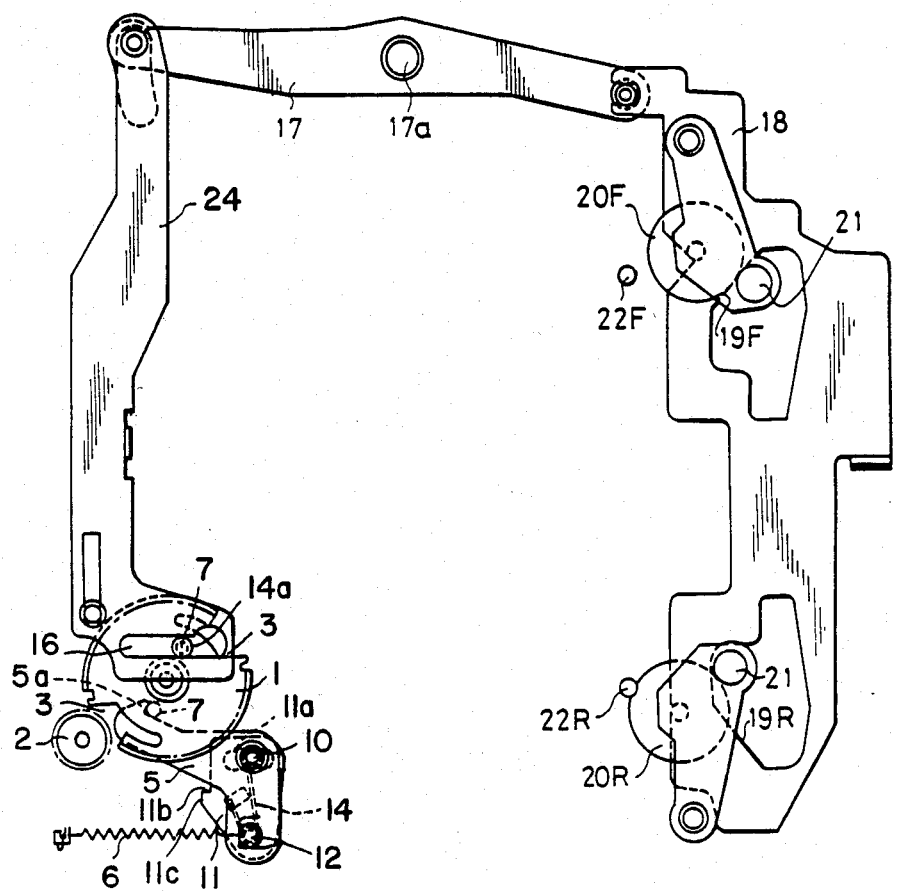
FIG. 13 shows the cyclical actuator of FIG. 12 having completed one half-cycle to disengage the forward drive capstan from its pinch roller, and to have its reverse drive capstan engaged by its associated pinch roller.

It will be realized that the previously described unlock disabling mechanism has application to a great many cyclicly operated and synchronizable systems of tape players. FIGS. 12-18 illustrate an application of the foregoing principles, as applied to a conventional tape player mechanism which operates responsively to a single energization of the actuation system shown in FIGS. 8-11 to cause a shift in capstan contact from forward to reverse pinch rollers attendant to reversal of tape drive. Thus, it will be noted that an arm 24 is provided coupled to an eccentric pin 14 on a cyclic actuator gear 1 engaging a slot 16 in the arm. The arm 24 is thus reciprocally operable responsively to each half rotation of the driven gear 1. The reciprocating arm 24 is coupled through a pivoting arm 17 mounted upon a mid-point pivot 17a to reciprocatingly actuate a pinch roller control plate 18. In FIG. 12 it will be noted that the system configuration shown therein has the forward pinch roller 20F engaged with the forward drive capstan 22F, the pinch roller carrier being urged by a spring (not shown) in the clockwise direction, by virtue of the cut-out geometry 19F in the control plate 18, to allow the carrier spring to force the forward drive pinch roller 20F into contact with the capstan drive 22F. It will further be noted that camming surface 19R on this same control plate 18 found in this position engages pin 21 of the roller carrier for the reverse drive pinch roller 20R to a retracted position as shown. FIG. 13 shows the effect of a half cycle rotation of gear 1 of the cyclical actuator when energized by the motor-driven pinion 2, wherein the pinch roller 20F has been withdrawn from contact with its associated capstan 22F by virtue of the camming surface 19F bearing against pin 21 of the pinch roller carrier. Concomittantly, the reverse drive pinch roller carrier has now rotated counterclockwise by its associated spring to allow the reverse pinch roller 20R to engage the reverse capstan drive 22R. Clearly, a subsequent further half-rotation of gear 1 will serve to reverse this state of affairs.

Figure 5:
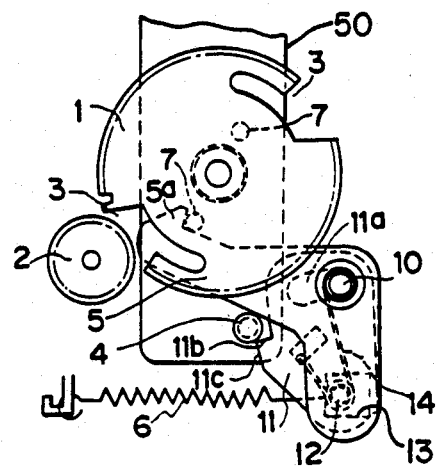
FIG. 5 is a plan view of a lock mechanism of the present invention wherein a camming latch member mounted on a lock member is placed in its normal dormant position confronting a release member pin mounted on a power plate.
Figure 6:
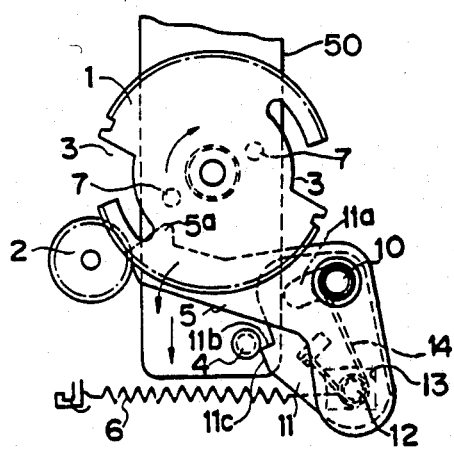
FIG. 6 is a plan view illustrating the first or unlocking phase of the lock mechanism of FIG. 5.
Figure 7:
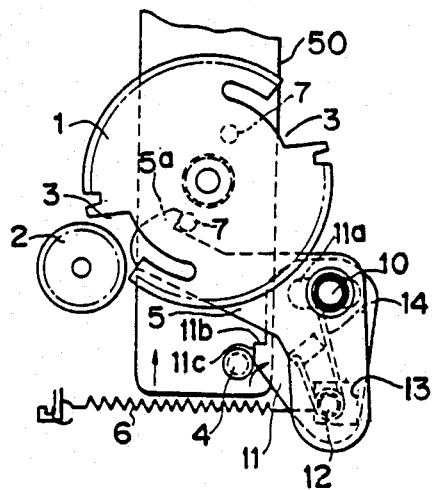
FIG. 7 is a plan view of the mechanism of FIG. 5 wherein the release member is on the way back to its normal dormant position.
Figure 14:
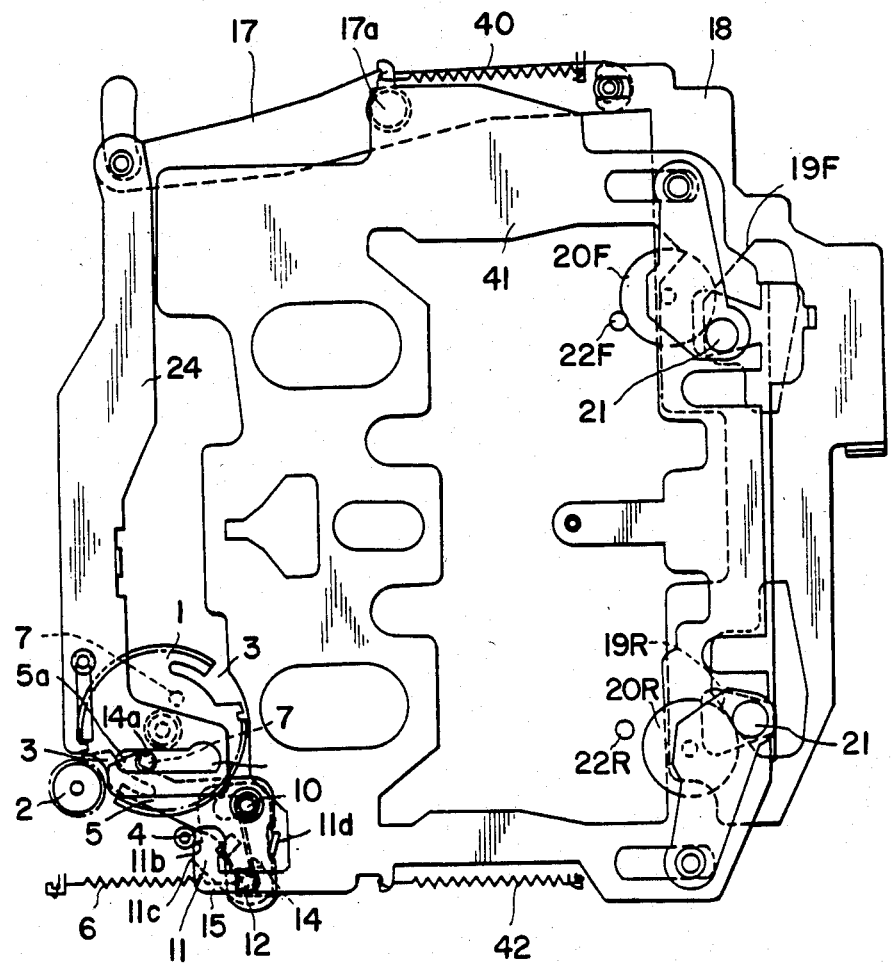
FIG. 14 shows a drive disengagement plate operable between two positions and shown disposed in a dormant position allowing independent drive reversal of the forward and reverse drive capstans as shown in FIGS. 12 and 13, as well as of the reel drive bases.
Figure 15:
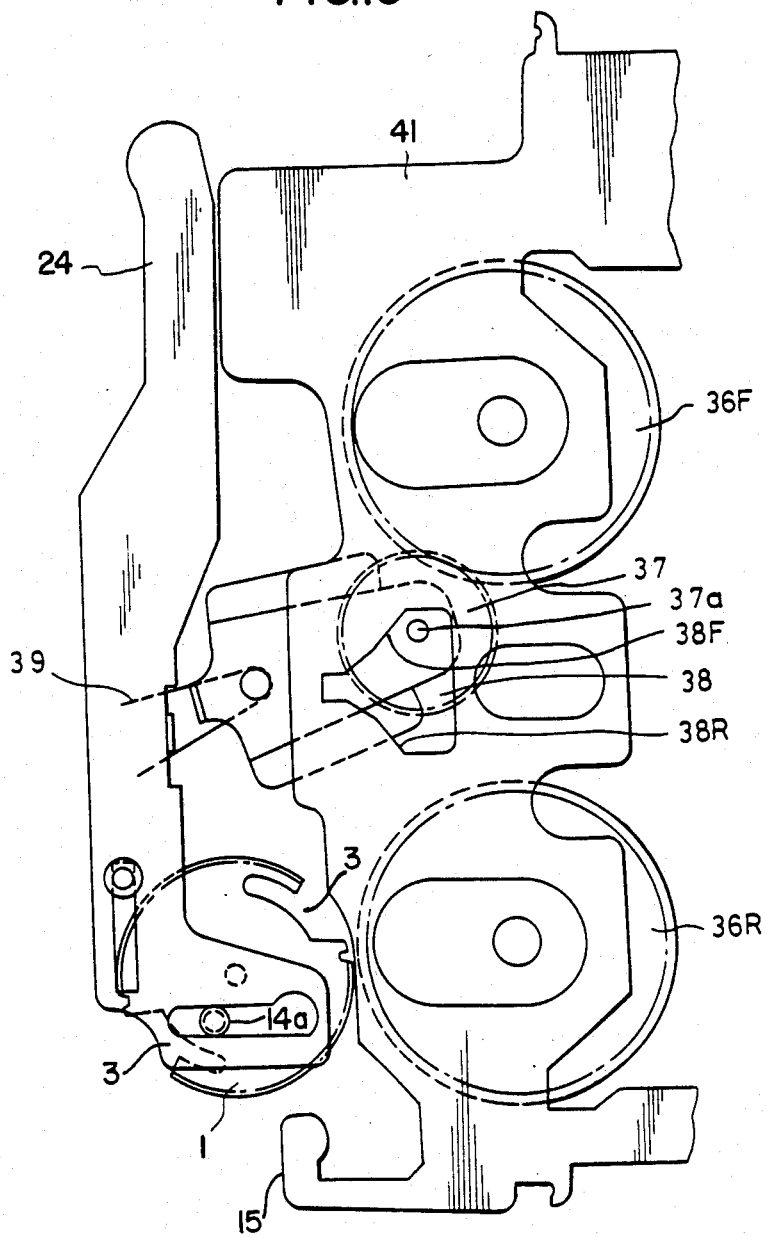
FIG. 15 shows the function of the drive disengagement plate in the leftward (dormant) orientation thereof, permitting selective actuation of the forward cassette reel base drive by the cyclic actuating system of FIG. 12.
Figure 16:
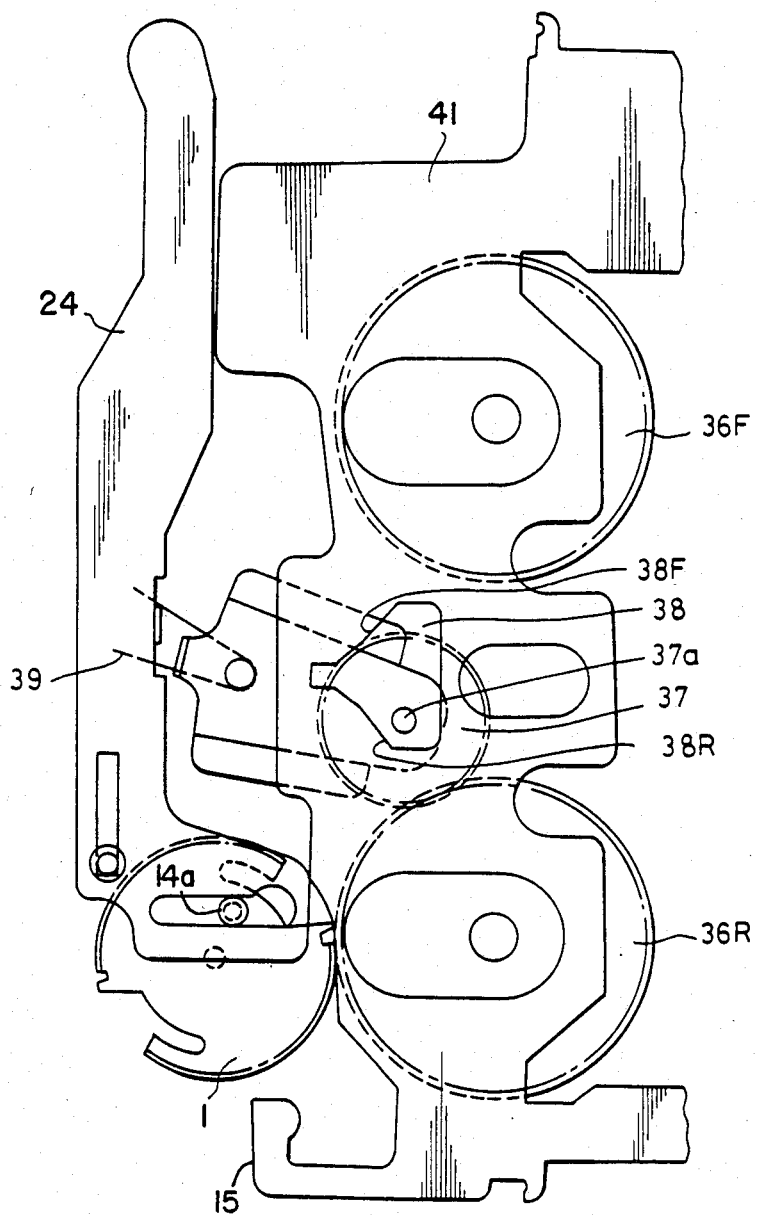
FIG. 16 shows the effect of the movement of the cyclic actuation system of FIG. 12 after a half-rotation thereof, showing reversal of cassette reel base drive to the reverse direction.

The previously mentioned disconnect feature whereby the unlocking phase of the cyclical actuator of FIGS. 5-7 may be inhibited by means of an extension 15 (See FIG. 7) may be applied to the drive reversal system of FIGS. 12 and 13 to insure that in the event of untimely accidental actuation of the cyclical actuator system of FIGS. 5-7 does not cause inadvertent reversal of this drive system. FIGS. 14-18 show details of a drive disconnect plate 41 configured so that in the rightward motion thereof all power is removed from the cassette reel bases, both forward and reverse drive pinch rollers are retracted, and the head (not shown) carried by this same plate is withdrawn from contact with the tape. In more detail, FIG. 14 shows this plate 41 positioned to the left to allow selective engagement of the pinch rollers an the reel drive bases to permit forward and reverse capstan tape drive changeover by the cyclic actuator without interference. FIG. 15 shows the action of this plate in the same position thereof to allow rotation of the reel base idler gear 37 moved by a coupling spring 39 connected to actuating arm 24 to permit drive to the forward reel 36F. FIG. 16 shows the reconfiguration of the idler gear 37 as actuated by the extension arm 24 in the opposite disposition of the cyclical mechanism wherein the extension arm 24 is extended forward (upward as in FIG. 16) to move the idler gear 37 to engage the reverse drive gear 36R for reverse drive of the tape reel base. It should be noted at this point that the stress on the idler coupling spring 39 in either forward or reverse drive condition is such as to urge the arm 24 return to a mid-stroke position. It will be noted with respect to FIG. 14 that with the disconnect plate 41 displaced to the left no interference occurs with actuation of the reel base drive changeover, nor with respect to the selective engagement of the forward and reverse drive pinch rollers with their respective capstans.

Figure 17:
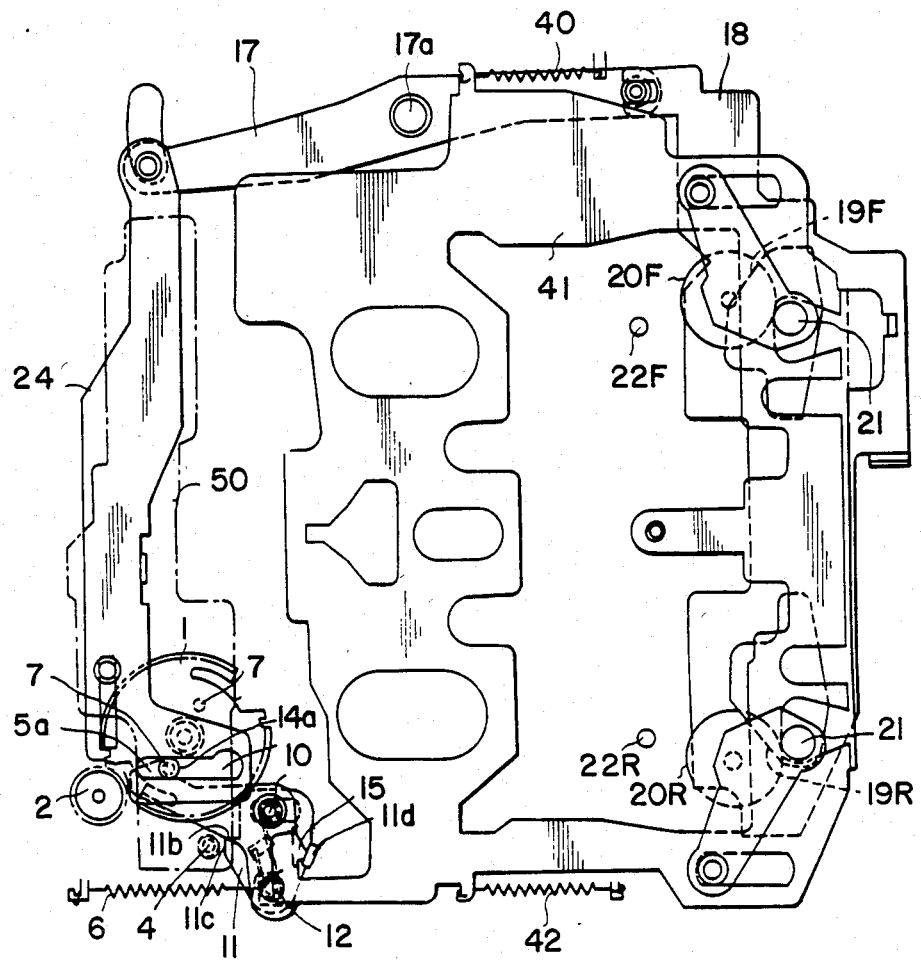
FIG. 17 shows the configuration of the system shown in FIG. 14, but wherein the drive disengagement plate is moved to the right to disengage both capstans from their associated pinch rollers, and withdrawing the head from contact with the tape.
Figure 18:
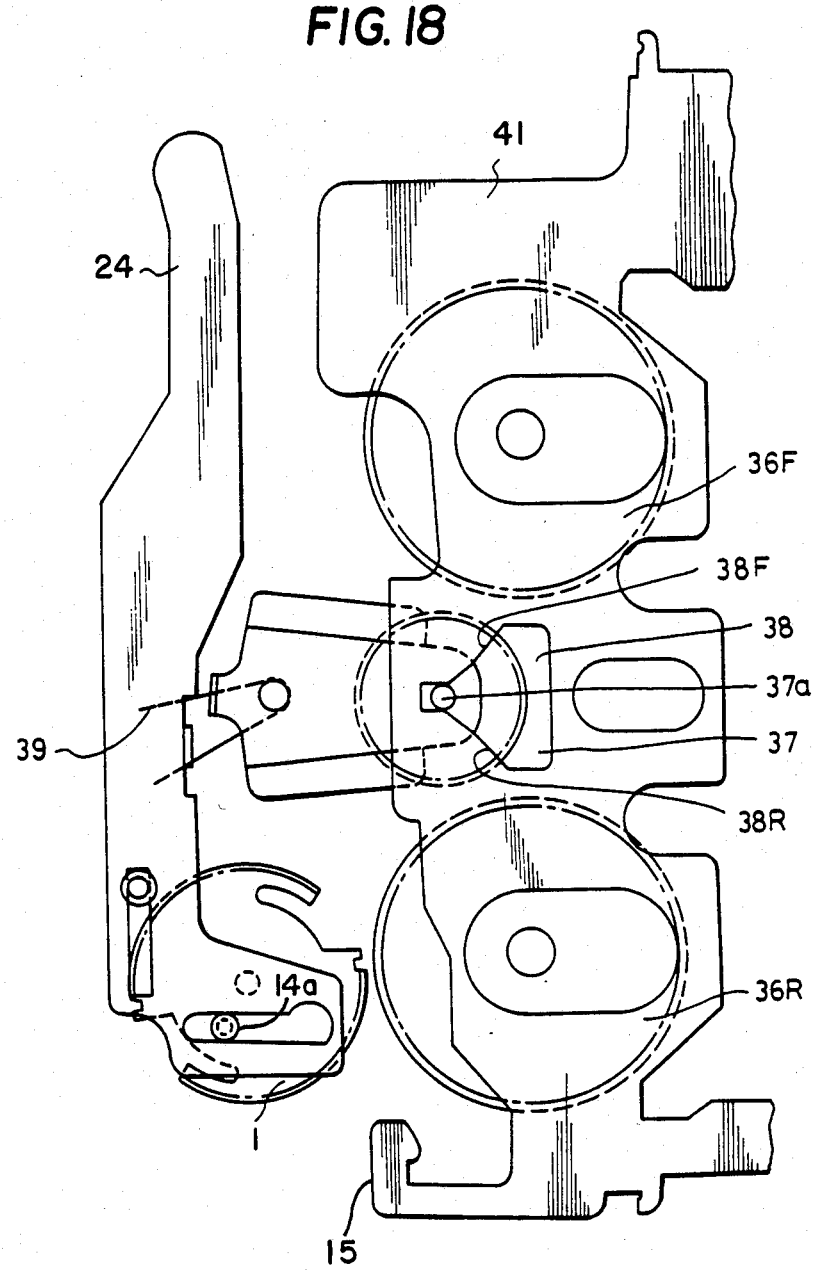
FIG. 18 shows the disengagement of the reel base drive resulting from this rightward movement of the drive disengagement plate of FIG. 17 to remove all drive power from either reel base, irrespective of the state of the cyclic actuator.

FIGS. 17 and 18 show the system with the master disconnect plate 41 displaced fully to the right. A variety of actuator means, including cyclical actuators similar to those previously described herein, may be used to secure this motion of the disconnect plate 41. It will be seen with reference to FIG. 17 that cut-outs in plate 41 engage both pinch roller pins 21-21 to retract both forward and reverse drive pinch rollers to a fully disengaged position, simultaneously retracting the head (not shown, and also mounted on this plate) to a fully retracted position so as not to contact the tape. Further, with reference to FIG. 18, it will be noted that the reel base drive idler gear 37 is trapped to a central position where it cannot supply power drive to the reel bases 36F, 36R. Such a system configuration is to be achieved, for example, immediately prior to ejection of a cassette, or attendant to the insertion thereof, to prevent engagement of any of the drive mechanisms to the cassette or its tape until it is properly positioned in the system. Further, it will be noted in FIG. 17 that extension 15 of the drive disconnect plate 41 has engaged the extension 11d (FIG. 11) of the latch member 11 to insure that the sector drive gear 1 remains in a locked position, and cannot be actuated by actuation of the power plate 50. The system is thus positively locked against such accidental energization of the power plate 50 upon, for example, cassette insertion. After such insertion and a concomitant shifting of the disconnect plate 41 to the left, the head (not shown) will shift leftward as seen in FIG. 17 to contact the tape, the capstans and pinch rollers will again be in position to selectively drive the tape according to the system configuration, and normal sequencing of events may proceed as before. Note in particular that until the head is properly positioned by displacement of the disconnect plate 41 to the left, actuation of the power plate 50 cannot cause power to be transferred to any of the drive elements of the system, in particular to the cyclic actuator gear 1.

It will be recalled that, with reference to FIGS. 15 and 16, that the biasing spring 39 in either stroke position of the actuating arm 24 exerts a force on the actuating arm 24 to urge it to a generally neutral mid-position state of this arm. It will further be noted that in both and forward and reverse drive configurations (FIGS. 12 and 13), the eccentric drive pin 14 is positioned slightly beyond the full half-rotation necessary to secure drive reversal. Thus, by the time that a reversal cycle has been completed, thereby positioning the appropriate gear cutout 3-3 opposite the drive pinion 2 (FIG. 12) to be disengaged therefrom, the force of the spring 39 will be coupled to the cutaway gear 1 to rotate it further clockwise, with the result that, should the lock member 5 be actuated counterclockwise to a decoupled condition, this spring force will automatically and almost instantaneously urge the gear 1 clockwise into engagement with the pinion 2 to be driven thereby. This spring force may, if desired, be further augmented by an auxiliary spring appropriately configured.

This initial rotation of the cyclic actuator gear gives rise to a further problem. Thus, should the auxiliary locking member 7 become accidentally momentarily unlocked, as for example in systems installed in automotive vehicles and subject to sudden shock, it is clear that if the motor driven pinion 2 is continuously driven such an accidental unlocking will cause an undesired reversal of drive. It is desirable that such unintentional drive actuation be avoided. A solution to this problem will be discussed next.

Figure 19:
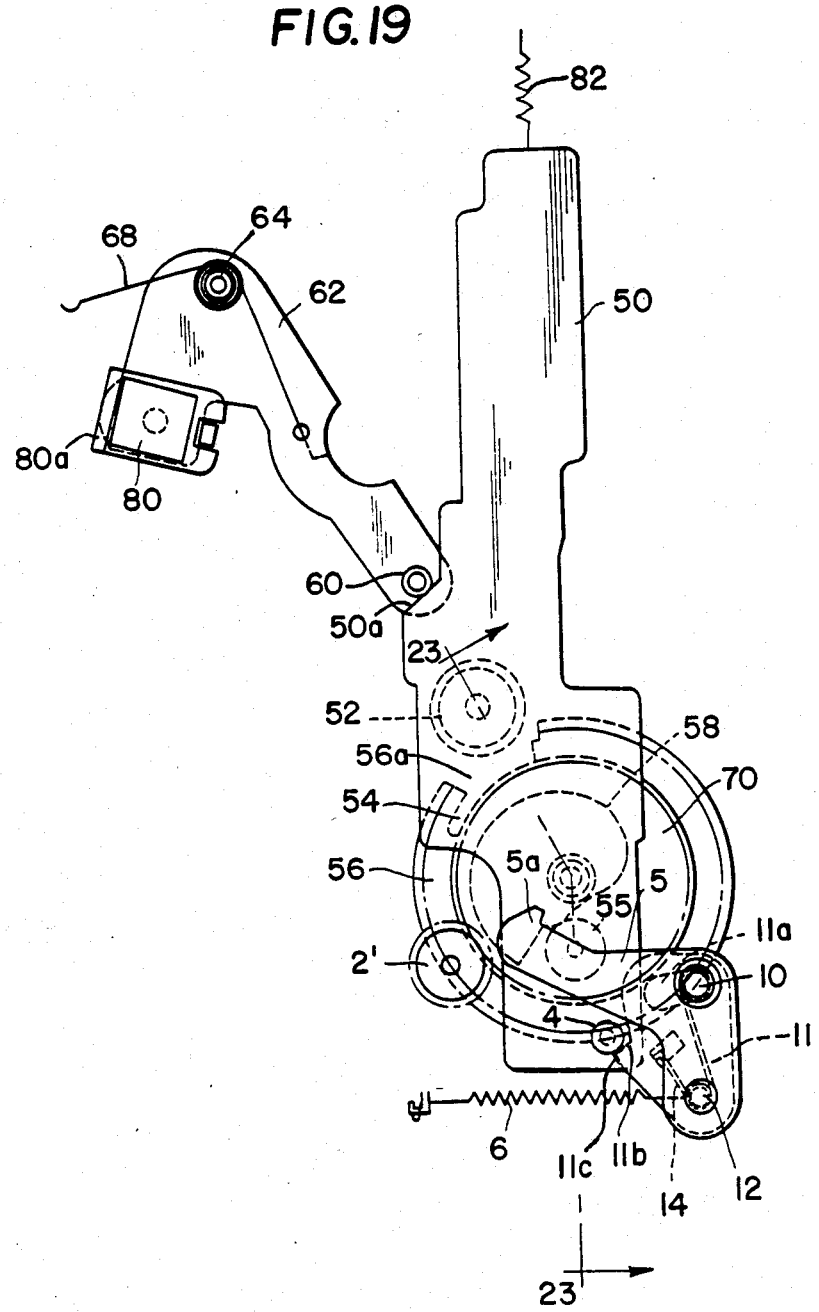
FIG. 19 shows the operation of a solenoid-released power plate supplying intermittent power to a cyclic actuating system such as shown in FIGS. 5–7, this figure showing the system in the dormant position before actuation of the power plate system.

To solve this problem a further novel feature of the invention resides in a cyclic actuator power transfer mechanism associated with the power plate 50, and shown in various stages of actuation in FIGS. 19-22. The power plate 50 is mounted (by means not shown) for linear vertical motion as seen in the figures. Recalling the general orientation of components with respect to the preceding figures, the power plate 50 is disposed to lie below the latch element 11 and the lock member 5. The power coupling pin 4 is mounted to extend upward from the power plate 50 to confront shoulder 11b of the camming latch member 11. The remaining portion of the cyclic actuator structure of FIGS. 5-11 (not shown in FIGS. 19-22), e.g. sector gear 1, are disposed above the lock member 5, the downwardly projecting locking pins 7 being configured for locking engagement with end portion 5A of the lock member 5. FIG. 19 shows the dormant position of the system. A sector gear 56 having a cut-out 54 is rotatably mounted on the frame of the player and is disposed generally below the power plate 50. Integral with gear 56 is a cam 58 disposed on the upper surface thereof. Also integral with sector gear 56 is a gear 70 disposed to continuously engage a power transfer pinion 2'. The power transfer pinion 2' is rigidly divingly coupled to the cyclic actuator pinion 2 of FIGS. 5-11. This is most simply done by placing the two elements in a simple coaxial arrangement on a common shaft. Further, the power plate gear 56 may be mounted coaxially with the cyclic actuator gear 1. These latter two elements, however, are not directly interconnected, power transfer therebetween being accomplished by the coupled pinions 2 and 2'. Further, a rotatable cam follower 55 is mounted on the lower surface of the power plate 50 to bear against the cam 58 integral with gear 56, the power plate being urged in a generally upward direction as seen in FIGS. 19-22 by a spring 82. A continuously driven pinion gear 52 is positioned to engage the teeth of sector gear 56 when the sector gear is properly rotated into position for engagement therewith. In the dormant position shown in FIG. 19, the power plate 50 is prevented from advancing upward by engagement of an engagement pin 60 confronting a shoulder 50a of the power plate. This engagement pin 60 is affixed to a lock arm 62 pivotally mounted to the frame of the player on a pivot 64. A clockwise rotation of the lock arm will being the engagement pin 60 out of abutment with shoulder 50a of the power plate 50 to allow the spring 82 to urge it in a generally upward direction from the dormant position shown in FIG. 19. The lock arm 60 is held in the counterclockwise locking position 60 shown in FIG. 19 by a solenoid 80 attracting a ferromagnetic member 80a mounted on the lock arm 62. Continuous energization of the solenoid 80 overcomes the clockwise force applied to the lock arm 62 by a spring 68. It should further be noted with respect to FIG. 19 that in the dormant position, although the release member 4 is shown contacting the confronting surface 11c of the camming latch member 11, such contact is not essential in the dormant position of the system. It will also be recalled that under such conditions the clockwise rotation of the locking arm 5 is set by its engagement with one of the pins 7-7 (FIG. 5) of the cyclic actuator gear 1. As will further be noted with respect to FIGS. 9-22, details of the previously described selective engagement system have been omitted from the drawings for purposes of clarity. Further with respect to the cyclic actuator of FIGS. 5-18, the sector gear 56 of the power plate 50 and the sector gear 1 of the cyclic actuator are disposed so that the portion 56a of gear 56a confronts the continuously driven drive pinion 52 at the same time that the cyclic actuator drive pinion 2 confronts one of the cutout portions 3-3 of the cyclic actuator gear 1.

Thus, to secure power drive from the continuously driven pinion 52 (FIG. 19) to gear 1 of the cyclic actuator, both the cutout gear 56 of the power plate and the cyclic actuator gear 1 must be engaged by their respective drive pinions, power transfer therebetween being then secured by the rigid interconnecting coupling of the two drive pinions 2 and 2'. Further with respect to the dormant condition shown in FIG. 19, it will be noted that the cam follower 55 mounted on the power plate 50 bears against the cam 58, tending to rotate the cam and its integral elements gear 70 and cutout gear 56 in a clockwise direction. Further movement beyond the dormant position shown in FIG. 1 is inhibited by the arresting of the upward motion of the power plate 50 by the lock arm engagement pin 60.

Figure 20:
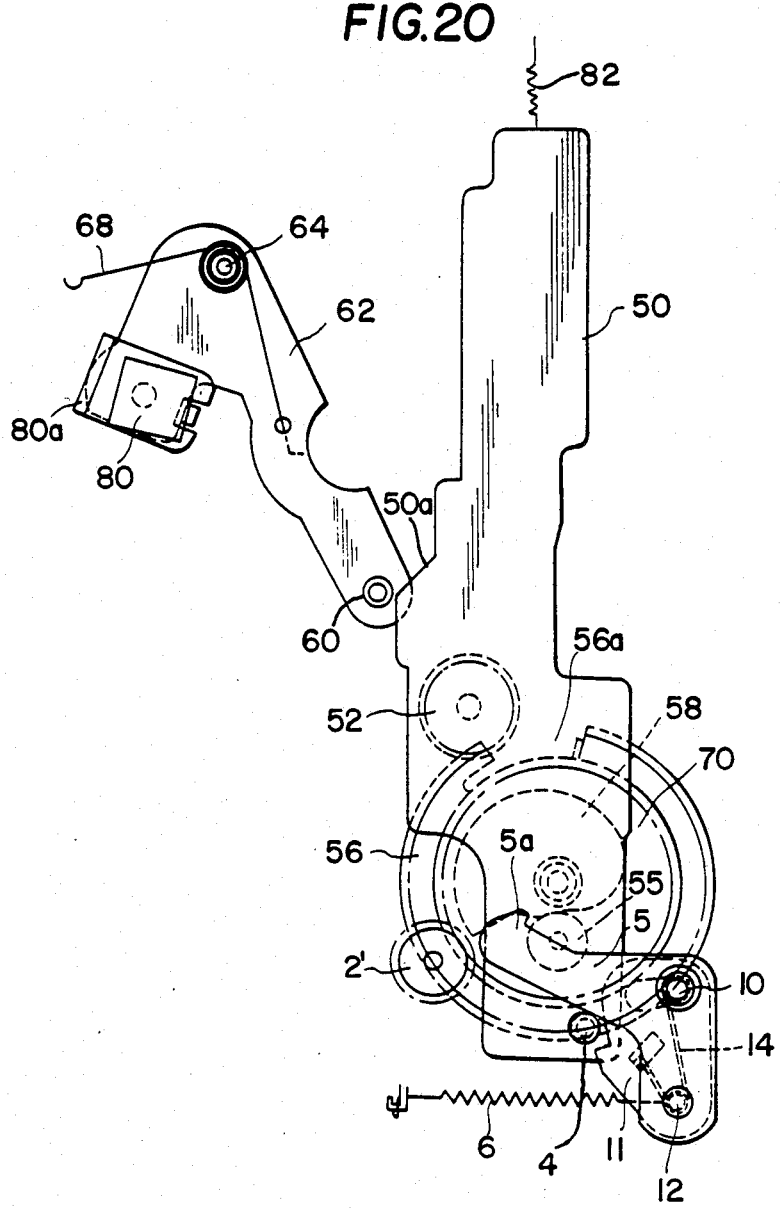
FIG. 20 shows the initial phase of actuation of operation of the power plate mechanism of FIG. 19.

FIG. 20 shows the immediate results of de-energizing of the solenoid 80. A spring 68 urges the lock arm 62 clockwise, removing the engagement pin 60 from its confronting relationship with shoulder 50a of the power plate, allowing spring 82 to urge the power plate slightly upward from its dormant state. The resulting movement of the power plate carries the cam follower 55 upward, thereby rotating sector gear 56 clockwise into engagement with the continuously driven pinion 52. Here the power plate 50 drives the gear 56. Also, the initial movement of the power plate 50 during the actuation phase thereof is in a slightly upward direction. Note, however, that although the sector gear 56 of the power plate is now in clockwise rotation, initiating the transfer of power via pinions 2 and 2' to the cyclic actuator gear 1, the locking member 5 has yet to be actuated to an unlocking position, with the result that the associated cyclic actuator gear 1 is still positioned with one of its cutout portions 3-3 confronting its drive pinion 2.

Figure 21:
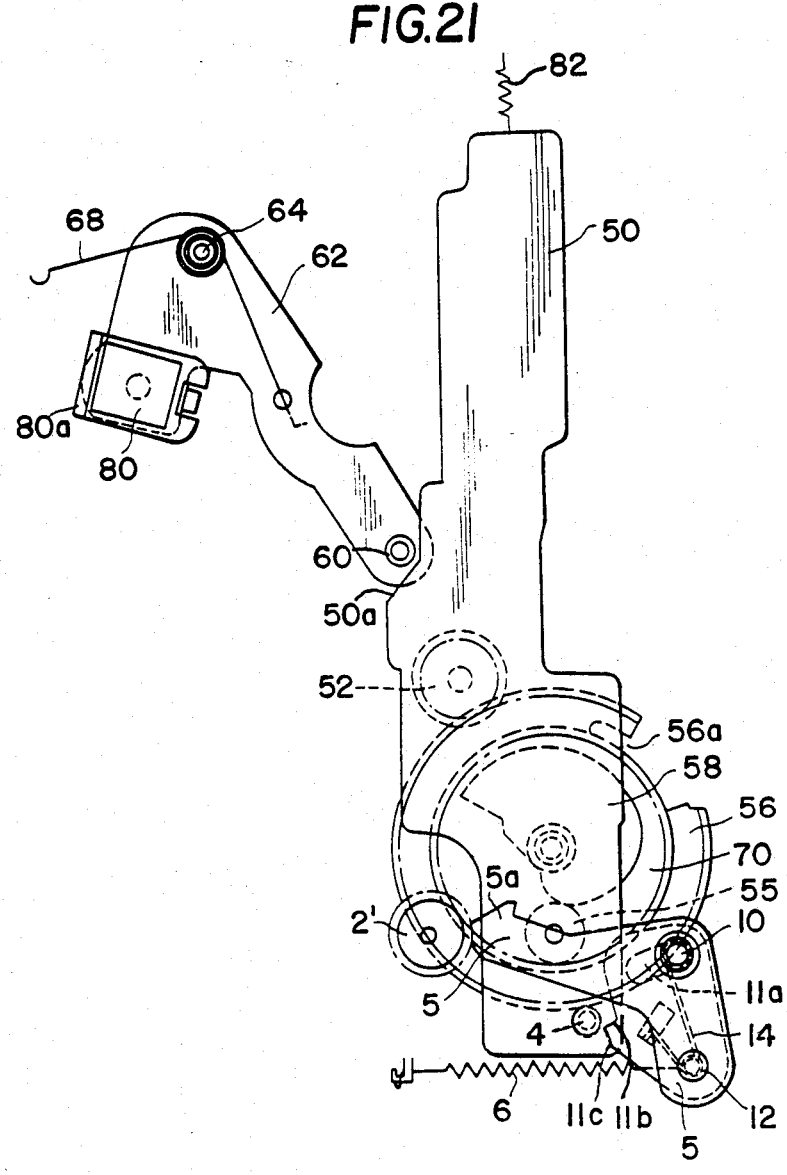
FIG. 21 shows a later phase of the power plate actuation system of FIGS. 19 and 20.
Figure 22:
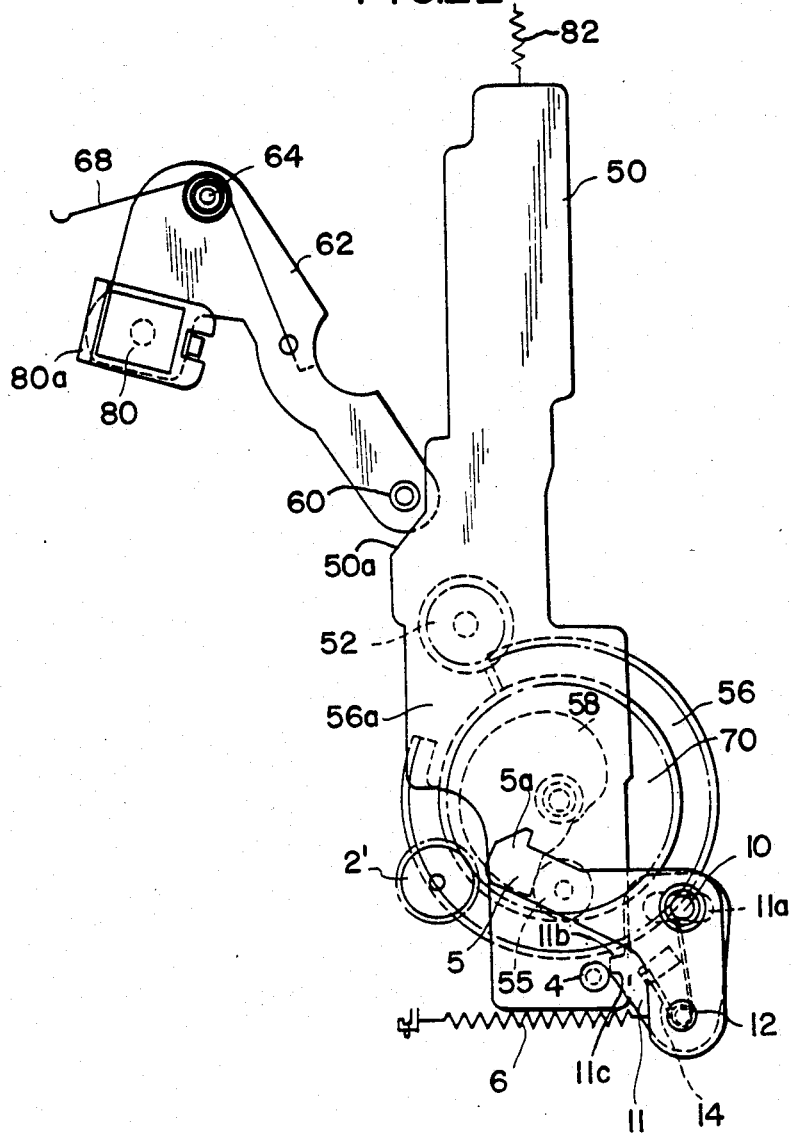
FIG. 22 shows the terminal phase of the power plate drive of FIGS. 19–21.
Figure 23:
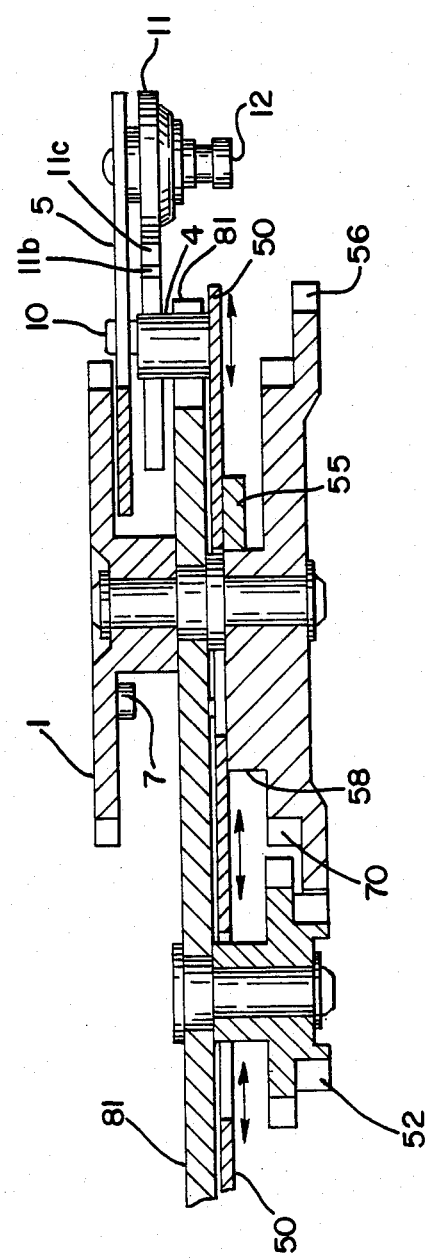

FIG. 21 shows a later phase in the power plate actuation cycle wherein the cam follower 55 has been driven by the pinion-driven cam 58 to urge the power plate 50 downward to rotate the locking member 5 counterclockwise, thus releasing the cyclic actuator (FIG. 6) to rotate under the action of the return spring 39 (FIG. 15) into engagement with its drive pinion 2. Now the gear 56 is driving the power plate 50. FIG. 21 also shows the configuration of the power plate 50 momentarily after the disengagement of camming latch 11, and immediately before the lock member 5 snaps clockwise to return to an intercepting position to terminate the rotation of the cyclic actuator 1. The cyclic actuator is now in a driven condition.

FIG. 21 shows the terminal phase of drive of th sector gear 56 by the continuously driven pinion gear 52. The power plate 4, having undergone its maximum downward extension, is now beginning to travel rapidly upward as the cam follower 55 encounters a generally radially oriented shoulder of the cam 1, allowing the spring 82 to pull the power plate upward. On this upward return stroke the camming action of the latch member 11 allows the power coupling pin 4 to move upward past the camming latch without actuating the locking member 5 to an unlocked position, as previously described. Also, by this time the solenoid 80 has been re-energized to rotate the lock arm 67 counterclockwise to reposition the lock arm engagement pin 82 in a generally confronting relationship with the power plate shoulder 50a. Upon final disengagement of the drive pinion 52 from the sector gear 56 the sector gear is given a terminal counterclockwise rotary motion by the upward movement of the cam follower 55 moved by the spring 82 until the lock arm pin 82 arrestingly engages shoulder 50a of the power plate 4, thus removing drive pressure from the cam follower 55 against the cam 58, and restoring the power plate to the dormant condition shown in FIG. 19 with the drive pinion 52 fully disengaged from sector gear 56 and facing the cutout sector 56a thereof.

With respect to the particular form of cyclic actuator shown in FIGS. 5-18, it will be noted that the present system has been described with respect to a two-position actuator, i.e. a cyclic actuator which operates through a first stroke upon energization of the power plate 50 and thereafter through a return stroke upon a subsequent actuation of the power plate. This is accomplished by placing two cutout sectors 3-3 in the actuator sector gear 1. On the other hand, a full-stroke actuator may readily be configured, using only a single cutout in the actuator gear 1, so as to provide a complete forward and reverse stroke upon each actuation of the system. Either such system, or evident derivatives thereof, may be used in association with the intermittent power plate coupling just described. With respect to the particular two-stroke actuator shown in FIGS. 5-18, the gearing ratio between sector gear 56. of the power plate drive system and pinions 2 and 2' coupling this gear to the cyclic actuator sector gear 1 is chosen to provide a two-to-one reduction ratio, so that a single rotation of the power plate sector gear 56 causes a half rotation of the cyclic actuator sector gear 1. This arrangement also allows the use of a lower torque motor to actuate the system.

Recapitulating, by configuring the cyclic system drive of FIGS. 5-18 with the power plate system shown in FIGS. 19-21, the desired immunity to system actuation arising from accidental disengagement of the lock member 5 from the pins 7-7 of the cyclic actuator gear 1 has been achieved. The lock arm 62, and only this lock arm, can actuate the cyclic actuator. Furthermore, the power plate system just described is fully compatible with the two previously discussed novel features of the invention, namely the quick-return lock member feature, as well as the unlock-disabling feature. Moreover, since sector gear 56 of the power plate drive system and sector gear 1 of the cyclic actuator may be mounted in a coaxial relationship, and because the drive pinions 2 and 2' may also be coaxially mounted, little, if any, additional lateral space is required by the incorporation of the power plate drive elements into the locking system previously described, resulting in the aforementioned desirable features without substantially increasing system space requirements.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention, in appropriate instances even the specific claims involved should be construed in light of the doctrine of equivalents.

The embodiments of the invention in which an exclusive property or privilege is claimed are defined as follows:

1. In a motor-driven cyclic actuator for a tape player having a rotatably mounted first sector gear having at least one cutaway portion with the teeth thereof cut away, said first sector gear being rotatably mounted on a frame of said player and being coupled to reciprocatingly drive a mechanical system of said player between two positions thereof, a first drive pinion rotatably mounted on said frame and disposed to drivingly engage said first sector gear and to disengage therefrom when said cutaway portion of said first sector gear is in a position confronting said first drive pinion, releasable locking means for interceptingly arresting said first sector gear in said confronting position thereof, first rotating means for rotating said first sector gear in a given direction from said confronting position thereof to be drivingly engaged by said first drive pinion responsively to release of said locking means and for rotating said first sector gear in said given direction to said confronting position at the end of an actuation cycle so as to be captured in said confronting position thereof by said locking means, and a reciprocatingly mounted power member operably actuated by power member drive means between dormant and extended positions and coupled to operate said locking means from a locked to an unlocked state attendant to motion of said power member in an advancing direction from said dormant to said extended position thereof to initiate a cyclic drive of said first sector gear, the improvement comprising:

releasable power member latching means for arresting said power member at said dormant position thereof, said power member drive means including means responsive to release of said power member latching means for operating said power member from said dormant position thereof to said extended position and thereafter back to said dormant position thereof;

a second drive pinion coupled to said motor to be driven thereby;

a second sector gear having the teeth thereof removed from a cutaway portion thereof and disposed to be drivingly engaged by said second drive pinion and to be disengaged therefrom when said second sector gear cutaway portion is in a position confronting said second drive pinion;

transfer gear means for continuously coupling said second sector gear to drive said first drive pinion; and second rotating means coupled to said power member and responsive to release of said latching means for urging said second sector gear from said confronting position thereof into meshing driven engagement with said second drive pinion attendant to motion of said power member from said dormant position thereof and for urging said second sector gear to said confronting position of said second sector gear responsively to return of said power member to said dormant position thereof upon disengagement of said second sector gear from said second drive pinion, said transfer gear means being configured to bring said cutaway portion of said first sector gear into a confronting position opposite said first drive pinion when said cutaway portion of said second sector gear is brought to a confronting position opposite said second drive pinion.

2. The cyclic actuator of claim 1 wherein said power member drive means includes resilient power member biasing means for urging said power member in a retrograde direction opposite said advancing direction thereof from said dormant position thereof, and said second rotating means includes camming means coupled to of said second sector gear and cam-engaging means coupled to said power member for rotating said second sector gear into engagement with said second drive pinion during initial retrograde motion of said power member from said dormant position thereof upon release of said power member latching means, and configured so that subsequent rotation of said second sector gear when engaged by said second drive pinion drivingly moves said power member to said extended position and configured so that said second sector gear upon subsequent disengagement thereof from said second drive pinion is driven by said camming means under the force of said power member biasing means to said conafronting disengaged position with respect to said second drive pinion.

3. The cyclic actuator of claim 1 wherein said first and said second sector gears are mounted in coaxial relationship, and said transfer gear means includes a power takeoff gear coaxially affixed to said second sector gear and a third drive pinion disposed to meshingly engage said power takeoff gear, and wherein said first drive pinion is rigidly coupled to said third drive pinion.

4. The cyclic actuator of claim 1 wherein said first sector gear has at least two such cutaway poritons thereof with the teeth thereof cut away, and said transfer gear means provides corresponding reduction of the drive rate of said first sector gear with respect to said second sector gear.

5. The cyclic actuator of claim 1 wherein said first sector gear has two such cutaway portions thereof with the teeth thereof cut away, and said transfer gear means provides a two-to-one reduction of the drive rate of said first sector gear with respect to said second sector gear.

6. In a cyclic actuator for a mechanical system of a tape player having an intermittently driven rotary member mounted to a frame of said player couple to actuate said system cyclically between first and second positions thereof, locking means including a locking member operable between releasing and arresting positions for releasing and subsequently interceptingly locking said rotary member in at least one biasing means dormant non-driven position and locking member biasing means for urging said locking member to said arresting position, and a reciprocating power member having a portion thereof actuatingly coupled to said locking member and operable by power member drive means between dormant and extended positions for operating said locking member to said releasing position against the force of said locking member biasing means attendant to movement of said power member in an advancing direction from said dormant to said extended position to initiate driving of said rotary member, the improvement wherein:

said locking means includes a coupling member movably mounted on said locking member disposed to couple said locking member to said power member portion during the advance thereof from said dormant to said extended position and operable between an intercepting position and a non-intercepting position with respect to said power member portion, means responsive to the position of said power member portion for operating said coupling member to said intercepting position prior to the advance of said power member, and automatic release means responsive to subsequent advancing movement of said power member portion after operating said locking member to said releasing position thereof for operating said coupling member to said non-intercepting position to release the actuating engagement of said locking member from said power member portion so that said locking member is actuated to said releasing position thereof during an initial portion of the operation of said power member from said dormant position to said extended position, and said automatic release means being responsive to the position of said power member portion for maintaining said coupling member in said non-intercepting position during subsequent motion of said power member portion therepast, so that said locking means reverts to and continuously maintains said intercepting position throughout the remainder of motion of said power member from said extended position to said dormant position thereof.

7. The cyclic actuator of claim 6 wherein said power member portion is configured as a power member pin affixed to said power member said locking means includes at least one rotary member pin affixed to said rotary member, said locking member is rotatably affixed to said frame, and said locking member biasing means is configured to urge said locking member to a confronting intercepting position with respect to the path of travel of said rotary member pin, said automatic release means including resilient coupling member biasing means for urging said coupling member to said intercepting position, said coupling member having a power-member-pin-engaging portion disposed to confrontingly engage and be driven against the force of said locking member biasing means by said power member pin during movemnt of said power member in said advancing direction thereof so as to move said locking member to release said locking member from engagement with said rotary member pin during movement of said power member to said extended position; said coupling member being configured so that further motion of said power member towards said extended position thereof rotates said locking member to carry said power-member-pin-engaging portion of said coupling member to a non-confronting position with respect to said power member pin, said coupling member being provided with a camming portion disposed to slidingly bear against said power member pin throughout the remainder of motion of said power member pin therepast, the strengths of said locking member biasing means and said coupling member biasing means being chosen so that while said power member pin engages said camming portion of said coupling member said locking member is held in said arresting position thereof.

8. In a cyclic actuator for a first mechanical system of a tape player having an intermittently driven rotary member coupled to actuate said first mechanical system cyclically between two positions thereof, locking means operable between releasing and intercepting positions for releasing and subsequently interceptingly locking said rotary member in at least one dormant non-driven position, locking means biasing means for urging said locking means into said intercepting position, and a power member having a portion thereof engagable with said locking means and operable between dormant and extended positions for operation said locking means to said releasing position attendant to movement of said power member by power member drive means from said dormant to said extended position to initiate rotation of said rotary member, said tape player further including a second mechanical system cyclically operable between first and second system positions, the improvement comprising:

a controllable coupling member coupling said power member portion to said locking means and operable between coupling and decoupling positions, said coupling member being coupled to respond to said second mechanical system to be operated to said decoupling position to decouple said power member portion from said locking means when said second mechanical system is in said first position thereof to prevent releasing of said locking means by actuation of said power member from said dormant to said extended position thereof, and to be operated to said coupling position to couple said power member portion to said locking means when said second mechanical system is in said second position thereof so that actuation of said power member from said dormant to said extended position thereof releases said locking means against the force of said locking means biasing means.

9. The cyclic actuator of claim 8 wherein said locking means includes a rotatable locking member configured to interceptingly lock said rotary member and operable between said intercepting and said releasing positions, said locking means biasing means being configured to urge said locking member to said intercepting position, said power member portion being configured as a pin mounted thereon, said locking member being disposed so as to be engagingly driven to said releasing position by said power member pin during motion of said power member from said dormant to said extended position thereof, said coupling member is movably mounted on said locking member and operable between a confronting position to engagingly confront said power member pin to be driven thereby to operate said locking member to said releasing position thereof and a non-confronting position where such engaging confrontation is prevented, said locking means including system coupling means for coupling said second mechanical system to said coupling member so that when said second mechanical system is in said second position thereof said coupling member is moved to said confronting position and so that when said second mechanical system is in said first position thereof said coupling member is moved to said nonconfronting position thereof.

10. The cyclic actuator of claim 9 wherein said locking means includes coupling member biasing means for urging said coupling member towards said confronting position, said second mechanical system being configured to engagingly move said coupling member against the force of said coupling member biasing means from said confronting to said nonconfronting position responsively to motion of said second mechanical system from said second to said first position thereof.

11. The cyclic actuator of claim 10 wherein the relative strengths of said locking means biasing means and said coupling member biasing means are chosen such that said locking member will remain in said intercepting position when said coupling member is moved to said nonconfronting position.

* * * * *